(12) United States Patent
Sun

(10) Patent No.: US 10,414,959 B2
(45) Date of Patent: Sep. 17, 2019

(54) ARTIFICIAL SNOW AT AMBIENT TEMPERATURE

(76) Inventor: Yingui Sun, Beijing (CN)

( * ) Notice: Subject to any disclaimer, the term of this patent is extended or adjusted under 35 U.S.C. 154(b) by 359 days.

(21) Appl. No.: 14/424,153

(22) PCT Filed: Aug. 27, 2012

(86) PCT No.: PCT/CN2012/080640
§ 371 (c)(1),
(2), (4) Date: Jul. 14, 2015

(87) PCT Pub. No.: WO2014/032226
PCT Pub. Date: Mar. 6, 2014

(65) Prior Publication Data
US 2015/0307760 A1    Oct. 29, 2015

(51) Int. Cl.
| | | |
|---|---|---|
| E01C 13/12 | (2006.01) | |
| C09K 3/24 | (2006.01) | |
| F25C 3/04 | (2006.01) | |
| H01F 1/01 | (2006.01) | |
| B22F 1/02 | (2006.01) | |
| B22F 9/04 | (2006.01) | |
| H01F 1/28 | (2006.01) | |
| B01J 2/00 | (2006.01) | |
| C22C 33/02 | (2006.01) | |

(52) U.S. Cl.
CPC .................. *C09K 3/24* (2013.01); *B01J 2/006* (2013.01); *B22F 1/02* (2013.01); *B22F 9/04* (2013.01); *E01C 13/12* (2013.01); *F25C 3/04* (2013.01); *H01F 1/01* (2013.01); *H01F 1/28* (2013.01); *C22C 33/0278* (2013.01); *C22C 2202/02* (2013.01)

(58) Field of Classification Search
CPC ............ E01C 13/10; E01C 13/12; C09K 3/24
USPC .................................. 404/21, 71, 32
See application file for complete search history.

(56) References Cited

U.S. PATENT DOCUMENTS

| 3,020,811 A | * | 2/1962 | Lincoln | ..................... | C09K 3/24 |
| | | | | | 106/272 |
| 3,066,580 A | * | 12/1962 | Alberti | ..................... | C09K 3/24 |
| | | | | | 404/17 |

(Continued)

FOREIGN PATENT DOCUMENTS

| CN | 1891779 A | 1/2007 |
| CN | 102194562 A | 9/2011 |

(Continued)

OTHER PUBLICATIONS

English language translation of JP 55090432 (Dec. 1978).*

(Continued)

*Primary Examiner* — Gary S Hartmann
(74) *Attorney, Agent, or Firm* — Scott Stimpson; Jason Plotkin

(57) ABSTRACT

Artificial snow at ambient temperature is used for skiing and is composed of grains of artificial snow at ambient temperature that include magnetic solid grains. The producing method comprises the following steps: (1) using a crushing apparatus to crush a magnetic material into solid grains; (2) using a mesh sieve to sieve the solid grains at a certain particle size; and (3) bonding a layer of material capable of modifying surface property to the surface of the solid grains obtained from sieving. A trail comprises the artificial snow at ambient temperature.

15 Claims, 3 Drawing Sheets

(56) References Cited

U.S. PATENT DOCUMENTS

| | | | |
|---|---|---|---|
| 3,189,667 A | | 6/1965 | Buttner et al. |
| 3,291,486 A | * | 12/1966 | Applegath ............... C09K 3/24 |
| | | | 428/15 |
| 3,400,643 A | * | 9/1968 | Holley .................... C09K 3/24 |
| | | | 472/90 |
| 3,443,492 A | * | 5/1969 | Pleass .................... B29C 67/04 |
| | | | 404/32 |
| 3,736,847 A | * | 6/1973 | Hickey ................... E01C 13/12 |
| | | | 404/17 |
| 8,541,530 B2 | * | 9/2013 | Smith ..................... C09K 3/24 |
| | | | 241/24.1 |
| 8,591,760 B2 | * | 11/2013 | Yanagida ............ C04B 35/2633 |
| | | | 252/62.59 |
| 9,183,972 B2 | * | 11/2015 | Li ............................. C08F 2/44 |
| 2007/0001021 A1 | | 1/2007 | Lang |
| 2008/0099715 A1 | * | 5/2008 | Adams ..................... C08K 3/32 |
| | | | 252/62.54 |
| 2011/0049258 A1 | | 3/2011 | Lehner et al. |
| 2012/0016099 A1 | | 1/2012 | Smith |
| 2014/0132376 A1 | * | 5/2014 | Jin ......................... C22C 38/10 |
| | | | 335/302 |

FOREIGN PATENT DOCUMENTS

| | | |
|---|---|---|
| EA | 201000995 A1 | 2/2011 |
| JP | S55090432 | 12/1953 |
| JP | 57-23144 U | 12/1978 |
| JP | S53148127 | 12/1978 |
| JP | H0388888 A | 4/1991 |
| JP | H08134438 A | 5/1996 |
| JP | 2000137353 A | 5/2000 |
| JP | 2003130514 A | 5/2003 |
| JP | 2011185920 A | 9/2011 |
| JP | 5590432 B2 | 9/2014 |
| RU | 84239 U1 | 7/2009 |
| RU | 2368639 C1 | 2/2011 |
| SU | 429672 A1 | 6/1974 |
| SU | 452566 A1 | 12/1974 |

OTHER PUBLICATIONS

Search Report for UAE/P/0242/2015 issued by Korean Intellectual Property Office, 5 pages.*
Kazakhstan Notice of allowance for application 2015/0340.1, dated Aug. 31, 2016, 5 pages.
English translation of Kazakhstan Notice of allowance for application 2015/0340.1, dated Aug. 31, 2016, 4 pages.
English abstract of RU2368639C1 above, 1 page.
English abstract of EA201000995A1 above, 1 page.
English abstract of CN1891779A above, 1 page.
Korean Office Action for application No. 10-2015-7006375 dated Oct. 26, 2016, 5 pages.
English translation of Korean Office Action for application No. 10-2015-7006375 dated Oct. 26, 2016, 5 pages.
Examination Report from Australian Patent Office for Application No. 2012388637, dated Apr. 27, 2015; 2 pages.
PCT International Preliminary Report on Patentability in PCT/CN2012/080640, dated Mar. 3, 2015; 7 pages.
PCT International Search Report for PCT/CN2012/080640, dated Mar. 21, 2013 ; 4 pages.
English Abstract of CN1891779A listed above; 1 page.
Office Action from Korean Intellectual Property Office for application 10-2015-7006375, dated Feb. 7, 2017, pp. 5.
Translation of Office Action from Korean Intellectual Property Office for application 10-2015-7006375, dated Feb. 7, 2017, pp. 3.
Third Office Action by Chinese Patent Office in Chinese application No. 201280075432.8, dated Nov. 29, 2016, 3 pages.
English translation of Third Office Action by Chinese Patent Office in Chinese application No. 201280075432.8, dated Nov. 29, 2016, 2 pages.
Final Office Action by Japanese Patent Office for Japanese Patent Application No. 2015-528826, dated Nov. 29, 2016, 5 pages.
English translation of Final Office Action by Japanese Patent Office for Japanese Patent Application No. 2015-528826, dated Nov. 29, 2016, 7 pages.
Further Examination Report issued by the New Zealand Intellectual Property Office ("NIPO") for New Zealand Application No. 705168 dated Dec. 21, 2015, 2 pgs.
First Office Action (Chinese language) issued by the State Intellectual Property Office ("SIPO") for Chinese Patent Application No. 201280075432.8 dated Jan. 12, 2016, 22 pgs.
English translation of First Office Action (listed above) issued by the State Intellectual Property Office ("SIPO") for Chinese Patent Application No. 201280075432.8 dated Jan. 12, 2016, 22 pgs.
English abstract of CN102194562A, 1 pg.
English abstract of SU429672A1, 1 pg.
First Examination Report issued by New Zealand Intellectual Property Office, in New Zealand application No. 705168, dated May 29, 2015; 3 pages.
English translation of Office Action (listed below) issued by the State Intellectual Property Office (SIPO) for the priority Chinese Application No. 201280075432.8 dated May 12, 2016 (14 pgs.).
English translation of Office Action (listed below) issued by the Korean Intellectual Property Office for the corresponding Korean Application No. 1020157006375 dated Apr. 27, 2016 (6 pgs.).
Office Action issued by the State Intellectual Property Office (SIPO) for the priority Chinese Application No. 201280075432.8 dated May 12, 2016 (13 pgs.).
Office Action issued by the Korean Intellectual Property Office for the corresponding Korean Application No. 1020157006375 dated Apr. 27, 2016 (9 pgs.).
Office Action issued by the Canadian Intellectual Property Office for the corresponding Canadian Application No. 2882504 dated Mar. 7, 2016 (4 pgs.).
Office Action issued by the Russian Patent Office in the corresponding Russian application dated Apr. 20, 2016, 7 pages.
Office Action issued by the Russian Patent Office in the corresponding Russian application dated Apr. 20, 2016, English Translation, 5 pages.
Search Report issued by the Russian Patent Office in the corresponding Russian application dated Apr. 20, 2016, English Translation, 2 pages.
Office Action issued by the New Zealand Patent Office in the corresponding New Zealand application dated May 10, 2016, 2 pages.
English abstract of JP2000137353(A) listed above, 1 page.
English abstract of JPS55090432 listed above, 1 page.
English abstract of JP2011185920(A) listed above, 1 page.
English translation of JPS53148127 listed above, 1 page.
English abstract of JP2003130514(A) listed above, 2 pages.
English abstract of JPH08134438(A) listed above, 1 page.
English abstract of JPH0388888(A) listed above, 1 page.
Supplementary European Search Report issued by the European Patent Office dated May 20, 2016, 7 pages.
Japanese Office Action for 2015-528826 dated Mar. 15, 2016, 7 pages.
English translation of JP57-23144, 2 pages.
KIPO Office action for application No. 10-2017-7001900, dated Mar. 24, 2017, 9 pages.
English translation of KIPO Office action for application No. 10-2017-7001900, dated Mar. 24, 2017, 8 pages.
Final office action issued by the Korean Patent Office dated Oct. 11, 2017 corresponding Korean Patent Application No. 10-20177001900 (3 pgs).
English Translation of Final office action issued by the Korean Patent Office dated Oct. 11, 2017 corresponding Korean Patent Application No. 10-20177001900 (4 pgs).
Office Action issued by the Canadian Patent Office for the corresponding Canadian Patent Application No. 2882504. The Office Action dated Nov. 16, 2017 (3 pgs).
English abstract of JP55-90432 (2 pgs).

(56) References Cited

OTHER PUBLICATIONS

First Office Action issued by the Indian Patent Office for the Indian Patent Application No. 590/MUMNP/2015. The Office Action dated Feb. 26, 2018 (5 pgs).
Second Office Action issued by the Japanese Patent Office for the Japanese Patent Application No. 2017-065838. The Office Action dated Mar. 27, 2018 (6 pgs).
English translation of Second Office Action issued by the Japanese Patent Office for the Japanese Patent Application Mo. 2017-065838. The Office Action dated Mar. 27, 2018 (5 pgs).
Canadian Office Action, Artificial Snow at Normal Temperature, App. No. 2,882,504, dated Aug. 9, 2018, p. 3.
First Office Action (Chinese language) issued by the State Intellectual Property Office ("SIPO") for Chinese Patent Application No. 201280075432.8 dated Jan. 12, 2016, 7 pgs.
English translation of First Office Action (listed above) issued by the State Intellectual Property Office ("SIPO") for Chinese Patent Application No. 201280075432.8 dated Jan. 12, 2016, 3 pgs.
Examination Report of Application No. 242/2015 (5 pgs) issued by Korean Intellectual Property Office.

* cited by examiner

ARTIFICIAL SNOW AT AMBIENT TEMPERATURE

CROSS REFERENCE TO RELATED APPLICATIONS

This application is based on International Application No. PCT/CN2012/080640 filed on Aug. 27, 2012. The entire contents of each and every foregoing application are incorporated herein by reference.

FIELD OF THE INVENTION

The present invention relates to artificial snow, a method for producing the artificial snow, and a trail made from the artificial snow. In particular, the present invention relates to artificial snow for skiing that is not subject to the restrictions of seasons and environmental temperature and a trail made from the artificial snow. The artificial snow can be paved on trails at different gradients.

BACKGROUND OF THE INVENTION

Skiing is a popular sport. However, skiing requires natural snow, which can be formed only under certain climatic conditions, e.g., the environmental temperature is very low. Consequently, skiing on natural snow is subjected to the restrictions of environmental temperature and seasons. Especially, the operation time of a ski resort is restricted by environmental temperature, seasons, and snow fall; in addition, the cost and workload required for creating trails are huge. Therefore, the income of a ski resort is severely affected by those factors.

In a ski resort, usually a snow making apparatus is used to make snow from water, and then the man-made snow is used to pave trails, in order to mitigate the effect of environmental temperature and seasons and increase the amount of snow. That approach consumes water and energy heavily, requires a long snow making time, and is costly; in addition, it is still severely subjected to the restrictions of environmental temperature and seasons.

At present, besides that dominant approach, there are two other approaches that can solve the problem of availability of natural snow, in order to mitigate the restrictions of environmental temperature and seasons on skiing and enable enjoying the pleasure of skiing more conveniently.

One approach is to utilize the grains of an organic material that can absorb water and thereby inflate to produce artificial snow. To improve the similarity of such artificial snow to natural snow, in some technical solutions in that approach, an organic cross-linking agent is added in the producing process to improve the aggregation among the grains, and inorganic substances (e.g., talcum) are added to improve the fluidity of the grains. However, such an approach still consumes water heavily and involves a complex producing process, and the features of the artificial snow obtained in that approach are not satisfactory; in addition, a problem of water evaporation is involved.

The other approach is to utilize a solid material rather than water to simulate the features of trails formed by natural snow. In some technical solutions in that approach, the grains of an organic material are mixed with a solid lubricating agent to produce artificial snow, the solid lubricating agent rendering certain adhesiveness and fluidity among the grains. In some other technical solutions, an artificial apparatus is used to simulate the feeling of skiing. For example, a solution skiing on plastic brushes, the so called "skiing-on-brush", is to lay brushes made of a macromolecular material (e.g., nylon) piece by piece at an appropriate location (e.g., on a slope), and slide on the brushes by means of a ski-board. As other examples, in some solutions commonly known as "skiing-on-mushroom", the head of each of the elongated elements of its brushs similar to the abovementuioend brushes is fabricated to have an arc shape. All of these technical solutions can be generally referred to as dry skiing. However, the feeling and effect of skiing that can be provided in the existing approaches in the prior art are quite different from those provided by skiing on natural snow; in addition, both the production and use are complex, and trails produced in such approaches can't be used as natural snow trails.

At present, snow is still mainly produced from water in ski resorts in order to increase the amount of snow, and the application scope of the two alternative approaches described above is very limited. Up to now, there is no alternative approach that can't be used to produce artificial snow on a large scale yet. Hence, there is an urgent need for developing a technique for producing artificial snow, which can simulate the features of natural snow well and is simple to produce and convenient to use, on a large scale from materials other than water.

SUMMARY OF THE INVENTION

An object of the present invention is to provide artificial snow at normal temperature, which can simulate the features of natural snow well, is simple to produce and convenient to use, thereby enabling a substantial reduction of the restrictions of environmental temperature and seasons on skiing and significantly increasing the returns of ski resorts.

Accordingly, the present invention provides artificial snow at normal temperature for skiing, composed of grains of artificial snow at normal temperature that include magnetic solid grains.

Preferably, the artificial snow at normal temperature is applicable to skiing in a ski resort, and can be paved massively on trails at different gradients.

Preferably, in pursuit of more different feelings of skiing, the residual magnetism in the grains can be selected freely within a range of 1,000-9,000 Gs. More preferably, the residual magnetism can be selected within a range of 2,000-9,000 Gs. More specifically, the residual magnetism is 2,000-2,300 Gs. If the solid grains are ferrite grains, the residual magnetism is preferably 2,000-2,300 Gs.

The present invention further provides a trail, comprising the artificial snow at normal temperature disclosed in the present invention.

Preferably, the trail further comprises a strong magnetic layer composed of several permanent magnet blocks, and these permanent magnet blocks are arranged in a uniform polarity orientation on the foundation of the trail and thereby forms a strong magnetic layer under the artificial snow at normal temperature.

In the present invention, the magnetism of a magnetic material is utilized to simulate the features of natural snow. Above all, the simulated snow can solve two problems: aggregation, i.e., the snow grains can aggregate and form stable distribution in specific shapes, and thereby adhere to trails at different gradients, similar to natural snow; 2) damped dispersion, i.e., it is easy to change the shapes of the simulated snow that aggregate in specific shapes under the action of external force, similar to the case of natural snow; in addition, the simulated snow can accept reshaping and dispersion with damping, and can even disperse into smaller aggregates or individual grains; such a feature is a required feature for skiing, for it can provide required resistance for the skier to slow down, control the direction, and even brake.

By bonding a layer of material that can modify the surface performance of the magnetic solid grains to the magnetic solid grains, for example, by applying a macromolecular material layer or metal coating, the surfaces of the magnetic solid grains can be modified, so that the surfaces of the grains obtain a lubricating property, which is helpful for reducing the friction force between the grains and a ski-board; in addition, the interaction between natural snow grains and between natural snow and ski-board can be further simulated.

The present invention further provides a method for producing artificial snow at normal temperature, comprising the following steps:

(1) producing solid grains consisting of a main body made of a non-magnetic material and containing a magnetic material;

(2) using a mesh sieve to sieve the solid grains at a certain grain size; and (3) magnetizing the solid grains obtained from the sieving by charging magnetism.

Preferably, the method further comprises the following step between the sieving step and the magnetization step: bonding a layer of material that can modify the surface performance of the solid grains obtained from the sieving to the surfaces of the solid grains obtained from the sieving.

Preferably, the material layer is a macromolecular material layer.

Preferably, the method further comprises: coloring the material layer which has been bonded to the solid grains.

The present invention further provides another method for producing artificial snow at normal temperature, comprising the following steps:

(1) Producing solid grains that contain a magnetic material;

(2) using a mesh sieve to sieve the solid grains that contain a magnetic material at a certain grain size; and (3) magnetizing the solid grains obtained from the sieving by charging magnetism.

Preferably, the method further comprises the following step between the sieving step and the magnetization step: bonding a layer of material that can modify the surface performance of the solid grains obtained from the sieving to the surfaces of the solid grains obtained from the sieving.

Preferably, the method further comprises: coloring the material layer which has been bonded to the solid grains.

Preferably, the step of producing solid grains that contain a magnetic material comprises: mixing a crushed or molten magnetic material with a molten material for the main bodies of the solid grains, and then pelleting, to obtain solid grains that contain a magnetic material.

Preferably, the step of producing solid grains consisting of a main body made of a non-magnetic material and containing a magnetic material further comprises: magnetizing the main body material by charging magnetism when the main body material is still in a molten state, and utilizing the strong magnetic force of a magnetic field to enable the magnetic material contained in the main body to align automatically orderly or enable the magnetic material contained in the main body to have the same polarity orientation.

The present invention is a pioneer invention for simulating natural snow, and has the following advantages.

1. The artificial snow at normal temperature disclosed in the present invention can simulate the features of natural snow well, is simple to produce and convenient to use, and can be used to substitute natural snow to create trails on a large scale.

2. The artificial snow at normal temperature disclosed in the present invention not only can be used to create trails solely formed by the artificial snow at normal temperature, but also can be used in mixture with natural snow to create trails.

3. With the artificial snow at normal temperature disclosed in the present invention, the operation time of a ski resort can be lengthened substantially, the cost of snow making in the ski resort can be reduced significantly, and the returns of the ski resort can be increased substantially. The artificial snow at normal temperature disclosed in the present invention can be used freely, not subjected to the restrictions of seasons and environmental temperature; for example, the trails can be paved with the artificial snow at normal temperature, covered by natural snow in winter, and formed by a mixture of natural snow and the artificial snow at normal temperature in transitional seasons. Thus, the skiing season can be extended and even cover all the four seasons of a year. Especially, with the artificial snow at normal temperature, the present situation of ski resorts in regions where the natural snow fall is inadequate and long time and high cost are required to make snow. In addition, the artificial snow disclosed in the present invention is helpful for simplifying the operations of trail creation, and thereby can reduce manpower and time cost required for trail creation.

DETAILED DESCRIPTION OF THE PREFERABLE EMBODIMENTS

Figure 1:
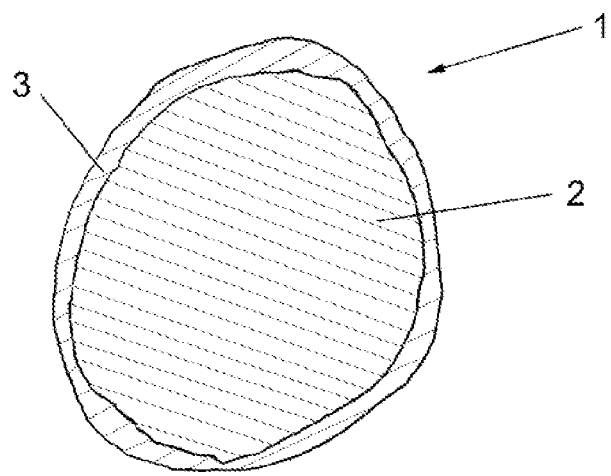
FIG. 1 is a schematic diagram of a single snow grain in an embodiment of artificial snow at normal temperature according to the present invention.

The embodiments described here are specific embodiments of the present invention, and are provided only to explain the ideal of the present invention. All these embodiments are explanatory and exemplary, and shall not be deemed as constituting any limitation to the embodiments and the scope of the present invention. Besides the embodiments described here, those skilled in the art can use other obvious technical solutions on the basis of the disclosure in the attached claims and the specification, and these technical solutions include technical solutions that are obtained by making obvious substitutions and modifications to the embodiments described here.

The accompanying drawings are schematic diagrams, and are provided to aid the explanation of the ideal of the present invention. They show the shapes of the elements and the relationship among the elements schematically. To ease reading and drawing, the dimensions in the drawings may be scaled up or down. Identical symbols in the drawings represent similar elements.

FIG. 1 shows schematically a single snow grain 1 of the artificial snow at normal temperature disclosed in the present invention. In a preferred embodiment of the present invention, the artificial snow at normal temperature is used for skiing, and consists of several snow grains 1. Each snow grain 1 includes a magnetic solid grain 2, with a material 3 that can modify the surface performance bonded to the surface of the solid grain 2; the material exhibits white color on the surface of the solid grain 2. For example, the bonded material layer 3 that can modify the surface performance can be a macromolecular material layer or a metal coating.

The grain size of the magnetic solid grain 2 can be selected according to the actual demand. For example, solid grain 2 at different grain sizes can be used at different parts of a trail. The grain size of the solid grain 2 can be greater than 4 mm or within a range of 0.1-4 mm, more preferably within a range of 1-3 m, even more preferably equal to 2 mm. Utilizing the different ranges and dimensions of grain size described above, the obtained artificial snow at normal temperature can have different features. In particular, the 1-3 mm grain size range has the highest applicability, and provides much better performance. The solid grains 2 can be made into any shape as required, such as spherical, ellipsoidal, triangular, square, or irregular polygonal shape, etc.

It should be noted that though the solid grains of artificial snow at normal temperature in the exemplary preferred embodiment described above has a surface covering layer designed to modify the surface performance, the present invention is not limited to that.

Since the solid grains 2 for producing the artificial snow at normal temperature have magnetism, apparent attractive force exists among the solid grains owing to the magnetism. Thus, these solid grains have an aggregation feature and a damped dispersion feature. These two features are the most important features required for simulating natural snow. The aggregation feature refers to that the snow grains 1 can aggregate together and form stable distribution in specific shapes, and thereby adhere to trails at different gradients. The damped dispersion feature refers to that the aggregated simulated snow in specific shapes can change the shape easily under external force, similar to the case of natural snow, and can accept reshaping and dispersion with damping, and even disperse into smaller aggregates or individual grains. That feature is a required feature for skiing, for it can provide required resistance for the skier to slow down, control the direction, and even brake.

Figure 2:
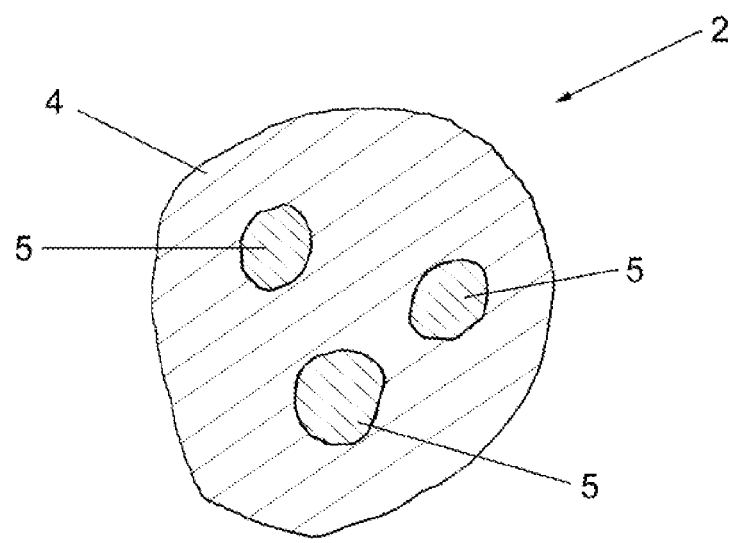
FIG. 2 is a schematic diagram of an embodiment of the solid grain contained in a single snow grain of the artificial snow at normal temperature according to the present invention, wherein, the solid grain has a main body made of a non-magnetic material and contains a magnetic material.

The magnetic solid grains 2 described above can be the grains made of a magnetic material as shown in FIG. 1 (the solid grains 2 shown in FIG. 1 are solely made of a magnetic material) or grains that have a main body made of a non-magnetic material and contain a magnetic material. FIG. 2 is a schematic diagram of another embodiment of the solid grain 2. The solid grain 2 has a main body made of a non-magnetic material 4 and contains a magnetic material 5. If the magnetic solid grains 2 are grains that have a main body made of a non-magnetic material and contain a magnetic material, the non-magnetic main body 4 of the solid grain can be selected freely from metal materials, organic materials, and inorganic non-metal materials; the magnetic material 5 can be dispersed in the main body 4 of the solid grain, or inlaid in the main body 4 of the solid grain, or encapsulated by the main body 4 of the solid grain. As described above, bonding a material layer that can modify the surface performance to the surfaces of the solid grains is not a necessity for the present invention. For example, if the main body of the solid grain is made of an organic macromolecular material, apparently it is only optional to bond a layer of organic macromolecular material to the surfaces of the solid grain; in addition, bonding a metal coating is also optional. In the present invention, whether to bonding a material layer that can modify the surface performance to the surfaces of the solid grains can be determined according to the specific technical solution.

The magnetic material in the solid grains 2 shown in FIG. 1 and FIG. 2 can be ferrite; a ferromagnetic material such as Fe, Co, Ni, etc.; or a rare earth permanent magnetic material. In view that a large quantity of magnetic material is required in the present invention, preferably a cheaper material is used, for example, a ferrite magnetic material or an Nd—Fe—B rare earth permanent magnetic material can be used. The residual magnetism in the solid grains 2 can be selected according to the actual demand, to meet the requirement for aggregation and damped dispersion features of snow grains 1, which are required for creating a trail. For example, the residual magnetism in the solid grains 2 can be selected within a range of 1,000-9,000 Gs, more preferably within a range of 2,000-9,000 Gs, such as 3,000 Gs or 4,000 Gs. The stronger the residual magnetism is, the stronger the attractive force among the snow grains 1 is, and the higher the damping exhibited in the damped dispersion is. If the magnetic material is ferrite, preferably the residual magnetism is 2,000-2,300 Gs, so that better aggregation and damped dispersion of the snow grains 1 can be realized.

The magnetic material in the snow grains can be a mixture of different magnetic materials, such as a mixture composed of a ferrite material and a rare earth permanent magnetic material. In the embodiment of solid grains 2 shown in FIG. 2, the magnetic materials 5 contained in the main body 4 made of a non-magnetic material can be grains of the same magnetic material or a mixture of grains of different magnetic materials, such as a mixture composed of a ferrite material and an Nd—Fe—B rare earth permanent magnetic material. The residual magnetism in rare earth permanent magnetic materials can reach a level higher than the residual magnetism in ferrites. By mixing a ferrite material with a rare earth permanent magnetic material, the residual magnetism in the solid grains can be increased, which means that the attractive force among the solid grains 2 can be increased; thus, the artificial snow at normal temperature will exhibit a higher damping feature when the snow grains are dispersed. To increase the attractive force among the solid grains 2, the solid grains 2 shown in FIG. 2 can be produced in a way that the magnetic material 5 attains a uniform polarity orientation.

As described above, the material layer 3 bonded to the surfaces of the solid grains for modifying the surface performance can be a macromolecular material layer or a metal coating. The macromolecular material is a plastic material, a paint material, or a polymer-based composite material. More specifically, the macromolecular material is polyethylene (PE), polypropylene (PP), polyvinyl chloride (PVC), or polyurethane, for example. Alternatively, the macromolecular material layer is baking vanish. By bonding a layer of material that can modify the surface performance to the magnetic solid grains, the surfaces of the magnetic solid grains can be modified, so that the surfaces of the grains obtain a lubricating property, which is helpful for reducing the friction force between the grains and a ski-board; in addition, the interaction between natural snow grains and between natural snow and ski-board can be further simulated.

In addition, besides white color, the artificial snow at normal temperature disclosed in the present invention can be produced in other colors. In particular, the macromolecular material layer is applied in a way that it can be colored firmly, so that the grains can have different colors, such as red, blue, or green, etc. Accordingly, the simulated snow can have higher applicability and enrich the skier's visual experience and entertainment.

The artificial snow at normal temperature disclosed in the present invention can be stored and used very conveniently. It can be used separately to create trails or used with natural snow together to create trails. In addition, the artificial snow at normal temperature disclosed in the present invention neither uses water nor involves any substance with unstable properties, and is very environment-friendly.

Figure 3:
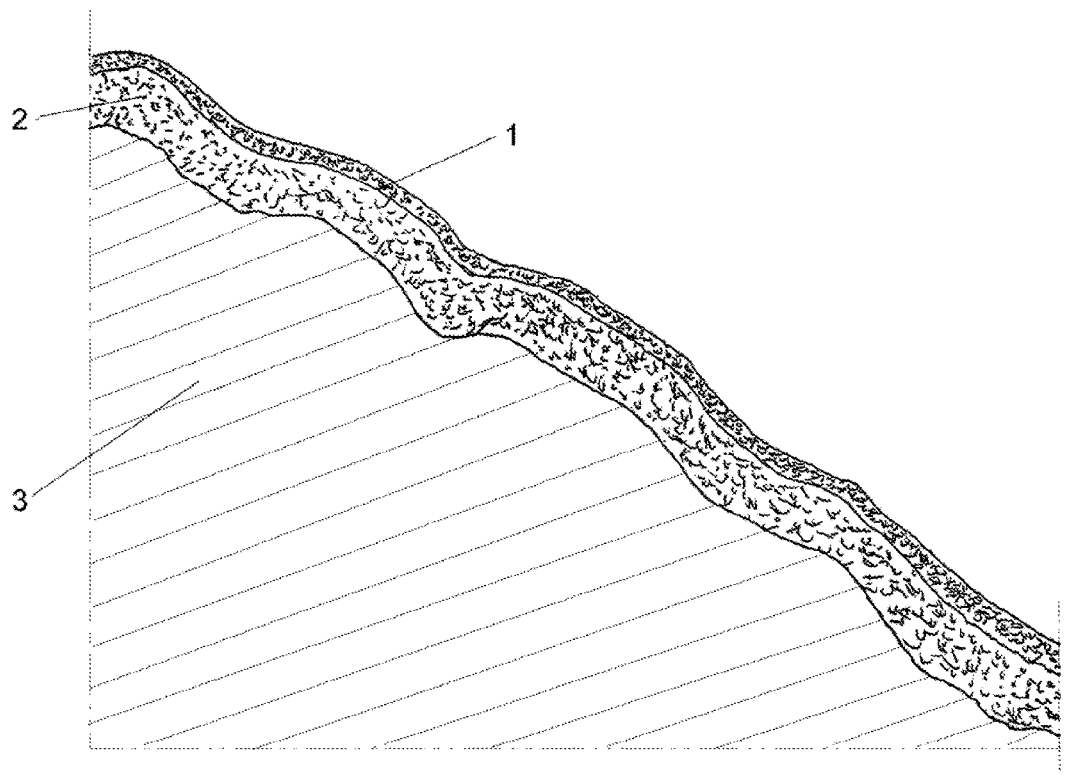
FIG. 3 is an illustrative partial sectional view of a first embodiment of a trail paved with the artificial snow at normal temperature according to the present invention, wherein, natural snow covers the artificial snow at normal temperature disclosed in the present invention.

FIG. 3 is an illustrative partial sectional view of a first embodiment of a trail created with the artificial snow at normal temperature in the present invention and natural snow in mixture. In FIG. 3, natural snow 6 covers the artificial snow at normal temperature 7 disclosed in the present invention, and the artificial snow at normal temperature disclosed in the present invention is paved on the foundation 8. The foundation 8 can be a natural foundation or an artificial foundation. As shown in the figure, the foundation is an undulating slope. Thus, natural snow 6 and the artificial snow at normal temperature 7 form a sloping trail together. Natural snow 6 and the artificial snow at normal temperature 7 can form trails at different gradients, including 0° gradient. On the trail in this embodiment, since a large quantity of artificial snow at normal temperature 7 substitutes natural snow 6, the consumption of natural snow 6 is significantly reduced, while the skiing feeling is essentially the same as that on a trail solely created with natural snow. In addition, compared to the prior art, with the artificial snow at normal temperature 7, the operations required for creating a trail can be greatly simplified.

Figure 4:
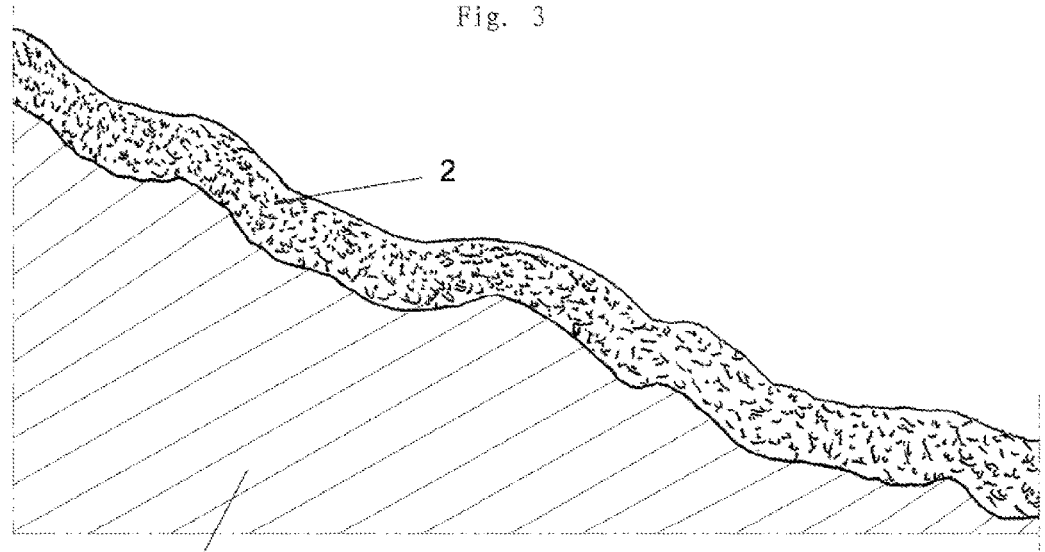
FIG. 4 is an illustrative partial sectional view of a second embodiment of a trail created with the artificial snow at normal temperature according to the present invention.

FIG. 4 is an illustrative partial sectional view of a second embodiment of a trail created with the artificial snow at normal temperature according to the present invention; Compared with the embodiment shown in FIG. 3, the difference in the second embodiment is: no natural snow is used; instead, the trail is created solely by paving the artificial snow at normal temperature 7 on the foundation 8. Such a trail is not subject to the restrictions of time and temperature completely.

Though the trail is created by covering natural snow 6 on the artificial snow at normal temperature 7 in the embodiment shown in FIG. 3, it should be noted that natural snow 6 can be mixed with the artificial snow at normal temperature 7 homogeneously or non-homogeneously to create a trail, which is to say, an embodiment in which natural snow is used in mixture with the artificial snow at normal temperature disclosed in the present invention is very flexible; in that case, the proportions between natural snow and the artificial snow at normal temperature and the paving method can be selected as required according to the actual situation.

Figure 5:
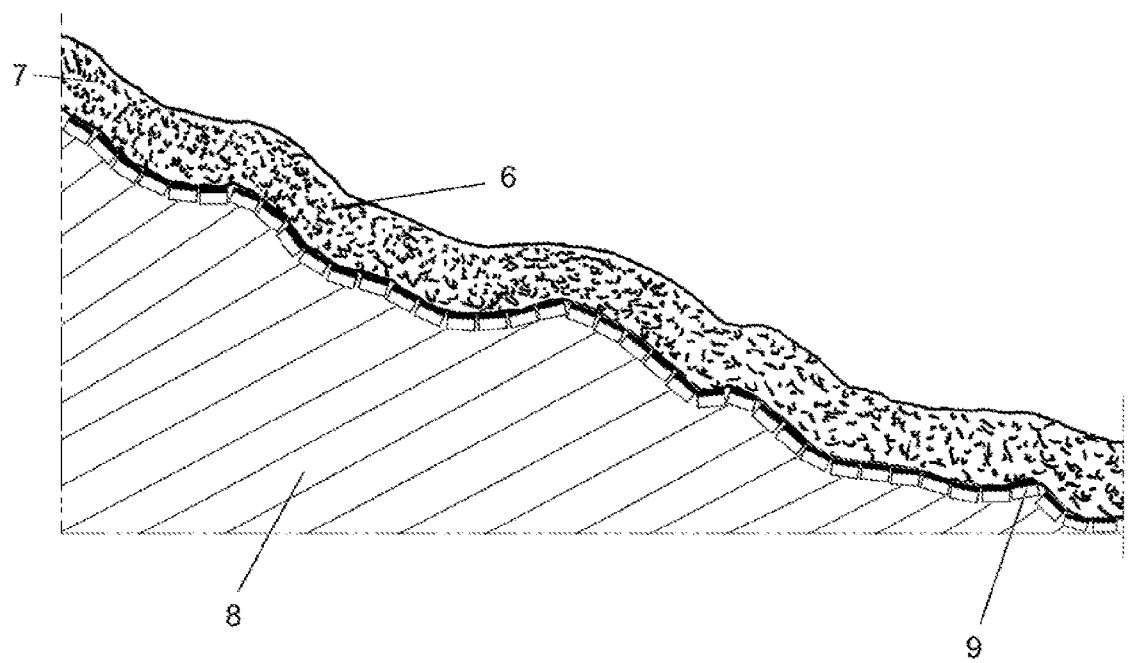
FIG. 5 is an illustrative partial sectional view of a third embodiment of trail paved by the artificial snow at normal temperature according to the present invention, wherein, permanent magnet blocks are laid under the artificial snow at a room temperature according to the present invention.

FIG. 5 is an illustrative partial sectional view of a third embodiment of a trail paved with the artificial snow at normal temperature according to the present invention.

Compared with the embodiment shown in FIG. 3, in the third embodiment, the trail further comprises a strong magnetic layer composed of several permanent magnet blocks 9, and these permanent magnet blocks 9 are arranged in a uniform polarity orientation on the foundation 8 of the trail and thereby forms a strong magnetic layer under the artificial snow at normal temperature 7. Under the strong magnetic action of the permanent magnet blocks 9, the snow grains 1 that form the artificial snow at normal temperature 7 can align to a polarity orientation automatically, so that the polarity orientation of the snow grains 1 is uniform as far as possible, and thereby higher attractive force can be created among the snow grains 1, and the snow grains 1 can exhibit higher dispersion resistance. As described above, damped dispersion is one of the most important features simulated by the artificial snow at normal temperature disclosed in the present invention, and the higher dispersion resistance among the snow grains 1 can meet a higher requirement for damped dispersion. The dimensions of the strong magnetic layer composed by the permanent magnet blocks 9 can be equal to the dimensions of the trail plane essentially, or can be smaller than the dimensions of the trail plane as required. The permanent magnet blocks 9 can be 10 cm×10 cm squares, for example.

Hereunder an embodiment for producing the artificial snow at normal temperature disclosed in the present invention will be described.

The artificial snow at normal temperature disclosed in the present invention, in which the solid grains 2 are made of a magnetic material solely, can be produced with a method that comprises the following steps:

(1) using a crushing apparatus to crush a magnetic material into solid grains;

(2) using a mesh sieve to sieve the solid grains at a certain grain size;

(3) bonding a layer of material that can modify the surface performance to the surfaces of the solid grains obtained from the sieving; and (4) magnetizing the solid grains with the above-mentioned material layer by charging magnetism.

Please note: the step (3) can be excluded from the above method, if it is unnecessary to bond a layer of material that can modify the surface performance to the surfaces of the solid grains.

The material layer is preferably a macromolecular material layer, or a metal coating.

Furthermore, the above method can further comprise: coloring the material layer which has been bonded to the solid grains.

If the solid grains 2 of the artificial snow at normal temperature in the present invention are grains that have a main body made of a non-magnetic material and contain a magnetic material, the producing method can comprise the following steps:

(1) producing solid grains consisting of a main body made of a non-magnetic material and containing a magnetic material;

(2) using a mesh sieve to sieve the solid grains that have a main body made of a non-magnetic material and contain a magnetic material at a certain grain size; and (3) magnetizing the solid grains obtained from the sieving by charging magnetism.

Furthermore, if surface modification is required for the obtained solid grains, the above method can further comprises the following step between the sieving step and the magnetization step: bonding a layer of material that modify the surface performance to the surfaces of the solid grains obtained from the sieving.

Furthermore, as required, the above method can further comprise: coloring the material layer which has been bonded to the solid grains.

When the solid grains 2 that have a main body made of a non-magnetic material and contain a magnetic material are produced, the main body of the solid grain can be a material selected from metal materials, organic materials, and inorganic non-metal materials; preferably, the solid grains that have a main body made of a non-magnetic material and contain a magnetic material are obtained by mixing a crushed or molten magnetic material with a molten material for the main body and then pelleting. If the main body of the solid grain is made of an organic macromolecular material, as described above, the step of bonding a layer of material that can modify the surface performance to the surfaces of the solid grains obtained from the sieving is not a necessity.

In order to increase the dispersion damping among the solid grains that have a main body made of a non-magnetic material and contain a magnetic material, i.e., in order to increase the attractive force among the solid grains, in the process that a crushed or molten magnetic material is mixed with a molten material for the main body and then the mixture is pelleted, preferably the magnetization is carried out when the material for the main body is still in a molten state, and the strong magnetic force of a magnetic field is utilized to enable the magnetic material contained in the main body to align automatically orderly or enable the magnetic material contained in the main body to have the same polarity orientation.

For the two producing methods described above, the mesh size of the mesh sieve can be selected according to the expected grain size of the solid grains, for example, the mesh size can be 4-10 mpi, more specifically 5 mpi, 8 mpi, or 9 mpi, etc.

The artificial snow at normal temperature disclosed in the present invention can simulate the features of natural snow well, is simple to produce and convenient to use, simplifies the operation of creating a trail, and can substitute natural snow on a large scale in order to create a trail, thereby enabling a substantial reduction of the restrictions of environmental temperature and seasons on skiing, lengthening the operating time of a ski resort, and significantly increasing the returns of the ski resort.

Some embodiments of the artificial snow at normal temperature disclosed in the present invention are described above. As stated above, the specific features of the artificial snow at normal temperature disclosed in the present invention, such as shape and size, can be designed specifically on the basis of the features disclosed above, and all these designs can be realized by those skilled in the art. In addition, those skilled in the art can combine and modify the features of the embodiments disclosed above as required, as long as the objects of the present invention can be attained. The scope of protection of the present invention is only confined by the attached claims.

The invention claimed is:

1. Artificial snow at ambient temperature for skiing, composed of grains of artificial snow at ambient temperature,
    wherein each grain of the artificial snow consists of a magnetic solid grain and a material layer that is bonded to a surface of the magnetic solid grain, has a substantively even surface, and modifies a surface property of the grain of the artificial snow to have a lubricating property, the grains of artificial snow aggregate together with adjacent grains contacting each other through the material layer of each grain of the artificial snow, and residual magnetism of the magnetic solid grain is within a range of 2,000-2,300 Gs and a grain size of the magnetic solid grain is 1-3 mm to allow the grains of artificial snow to be reshaped and dispersed with damping under external force and form a stable distribution in specific shapes configured to adhere to trails at different gradients;
    wherein the material layer is a metal coating.

2. The artificial snow at ambient temperature as described in claim 1, wherein, the artificial snow at ambient temperature is applicable to skiing in a ski resort, and is paved massively on trails at different gradients.

3. The artificial snow at ambient temperature as described in claim 1, wherein, the magnetic solid grain consists of a main body made of a non-magnetic material and containing a magnetic material, and the non-magnetic material is a material selected from metal materials, organic materials, and inorganic non-metal materials.

4. The artificial snow at ambient temperature as described in claim 3, wherein, the magnetic material is dispersed in the non-magnetic material that forms the main body.

5. The artificial snow at ambient temperature as described in claim 1, wherein, the magnetic solid grain is made of a ferrite material, ferromagnetic material, or rare earth permanent magnetic material.

6. The artificial snow at ambient temperature as described in claim 1, wherein solid grains of the grains of artificial snow comprise at least two kinds of magnetic material.

7. The artificial snow at ambient temperature as described in claim 6, wherein the at least two kinds of magnetic materials comprise a ferrite material and an Nd—Fe—B rare earth permanent magnetic material.

8. A trail, comprising artificial snow, wherein the artificial snow is at the ambient temperature as described in claim 1.

9. The trail as described in claim 8, further comprising a strong magnetic layer composed of several permanent magnet blocks, which are arranged in a uniform polarity orientation on the foundation of the trail and thereby forms a strong magnetic layer under the artificial snow at ambient temperature.

10. A method for producing artificial snow at ambient temperature, each grain of the artificial snow consisting of a magnetic solid grain and a material layer that is bonded to a surface of the magnetic solid grain, having a substantively even surface, and modifies a surface property of the grain of the artificial snow to have a lubricating property, the grains of artificial snow aggregate together with adjacent grains contacting each other through the material layer of each grain of the artificial snow, comprising the following steps:
    (1) using a crushing apparatus to crush a magnetic material into solid grains;
    (2) using a mesh sieve to sieve the solid grains at a certain grain size, and then bonding the material layer to surfaces of the solid grains obtained from the sieving; and
    (3) magnetizing the solid grains obtained from the sieving by charging magnetism;
    wherein residual magnetism in the solid grains is within a range of 2,000-2,300 Gs and a grain size of the magnetic solid grain is 1-3 mm to allow the grains of artificial snow to be reshaped and dispersed with damping under external force and form a stable distribution in specific shapes for adhering to trails at different gradients;
    wherein, the material layer is a metal coating.

11. The method as described in claim 10, further comprising: coloring the material layer which has been bonded to the solid grains.

12. A method for producing artificial snow at ambient temperature, each grain of the artificial snow consisting of a magnetic solid grain and a material layer that is bonded to a surface of the magnetic solid grain having a substantively even surface, and modifies a surface property of the grain of the artificial snow to have a lubricating property, the grains of artificial snow aggregate together with adjacent grains contacting each other through the material layer of each grain of the artificial snow, comprising the following steps:
- (1) producing solid grains consisting of a main body made of a non-magnetic material and containing a magnetic material;
- (2) using a mesh sieve to sieve the solid grains at a certain grain size, and then bonding the material layer to surfaces of the solid grains obtained from the sieving; and
- (3) magnetizing the solid grains obtained from the sieving by charging magnetism;
- wherein the residual magnetism in the solid grains is within a range of 2,000-2,300 Gs and a grain size of the magnetic solid grain is 1-3 mm to allow the grains of artificial snow to be reshaped and dispersed with damping under external force and form a stable distribution in specific shapes configured to adhere to trails at different gradients;
- wherein, the material layer is a metal coating.

13. The method as described in claim 12, further comprising: coloring the material layer which has been bonded to the solid grains.

14. The method as described in claim 12, wherein, the step of producing solid grains consisting of a main body made of a non-magnetic material and containing a magnetic material comprises: mixing a crushed or molten magnetic material with a molten non-magnetic material and then pelleting, to obtain solid grains consisting of a main body made of the non-magnetic material and containing the magnetic material.

15. The method as described in claim 14, wherein, the step of producing solid grains consisting of a main body made of a non-magnetic material and containing a magnetic material further comprises: magnetizing the main body material by charging magnetism when the main body material is still in a molten state, and utilizing the strong magnetic force of a magnetic field to enable the magnetic material contained in the main body to align automatically orderly or enable the magnetic material contained in the main body to have the same polarity orientation.

* * * * *